United States Patent [19]

Hashish et al.

[11] Patent Number: 5,050,895
[45] Date of Patent: Sep. 24, 1991

[54] HIGH PRESSURE DYNAMIC SEAL

[75] Inventors: Mohamed A. Hashish, Kent; John H. Olsen, Vashon Island; Anton H. Buchberger, Renton; Olivier L. Tremoulet, Jr., Andover; Sigurd C. Mordre, Vashon Island; David K. M. Tan, Seattle, all of Wash.

[73] Assignee: Flow International Corporation, Kent, Wash.

[21] Appl. No.: 333,342

[22] Filed: Apr. 4, 1989

[51] Int. Cl.⁵ .............................................. F16J 15/18
[52] U.S. Cl. .............................. 277/188 R; 92/165 R; 92/168; 277/194
[58] Field of Search ................. 277/115, 103, 188 R, 277/194, 178, 187, 71, 181, 183, 184; 92/165 R, 166, 167, 168

[56] References Cited

U.S. PATENT DOCUMENTS

| | | | |
|---|---|---|---|
| 2,314,683 | 3/1943 | Berry | 92/166 X |
| 2,757,053 | 7/1956 | Green | 277/188 R X |
| 2,992,817 | 7/1961 | Templeton | 277/187 X |
| 3,004,783 | 10/1961 | Webb | 277/103 |
| 3,363,511 | 1/1968 | Hott et al. | 277/71 X |
| 3,685,398 | 8/1972 | Little | 92/168 X |
| 3,889,958 | 6/1975 | Bennett | 277/194 X |
| 4,448,424 | 5/1984 | Ernst | 277/115 X |
| 4,480,842 | 11/1984 | Mahyera et al. | 277/71 X |
| 4,594,938 | 6/1986 | Shore | 92/168 X |
| 4,889,039 | 12/1989 | Miller | 92/165 R X |

FOREIGN PATENT DOCUMENTS

| | | | |
|---|---|---|---|
| 128153 | 1/1932 | Austria | 277/188 R |
| 2239387 | 2/1974 | Fed. Rep. of Germany | 277/188 R |
| 153218 | 7/1952 | Sweden | 277/188 R |
| 877182 | 11/1981 | U.S.S.R. | 277/188 R |

Primary Examiner—William A. Cuchlinski, Jr.
Assistant Examiner—Scott Cummings
Attorney, Agent, or Firm—Hughes & Multer

[57] ABSTRACT

A seal assembly having a backup ring through which a piston reciprocates. There is a seal sleeve made of a non-abrading, extrusion resistant material that surrounds the piston at a location forwardly of the backup ring. The backup ring has an opening to receive the piston, and the opening is formed to define a radially and rearwardly expanding gas between the piston and backup ring to receive and discharge any seal material which may extrude into the gap. There is a positioning flange integral with the backup ring that surrounds the seal sleeve to press the seal sleeve into engagement with the piston, and there is an outer seal portion to form a seal between the positioning flange (or the outer portion of the backup ring) and the cylinder.

46 Claims, 7 Drawing Sheets

HIGH PRESSURE DYNAMIC SEAL

BACKGROUND OF THE INVENTION

1. Field of the Invention

The present invention relates to high pressure seals, and more particularly to such a seal which is formed between two moving parts, such as in a high pressure fluid pump having a cylinder and a piston which reciprocates therein.

2. Background Art

There are various applications for high pressure pumps, one being to supply very high pressure fluid (e.g. water at a pressure as high as 10,000 psi to 100,000 psi, or possibly higher) so that this water may in turn be discharged in the form of a high velocity water jet which can be used for cutting, abrading, etc. A common configuration for such a pump is to employ a reciprocating piston which operates in a high pressure cylinder to direct the fluid, generally water, to a manifold, from which the water is guided (plumbed) to a nozzle and then discharged as a high pressure jet, possibly with an abrasive material added thereto. On the pressure stroke, the plunger or piston can generate very high pressures in the chamber, sometimes well in excess of 25,000 psi, while during the intake stroke the pressure in the cylinder chamber is substantially zero or very low.

There are a number of critical problem areas associated with the design and operation of such a high pressure fluid pump assembly. One of the problems is to provide an adequate seal between the cylinder and the piston. Even though the cylinder and piston (and also some of the other components) are made of a rigid material (e.g. metal), with the very high pressures involved, there can be a certain amount of compression, expansion or other deformation of these components. Also, the seal material itself is exposed to widely fluctuating pressures, ranging all the way from the maximum pressure in the high pressure cylinder chamber during the discharge stroke to the low pressures which occur during the intake stroke of the piston. Various seal configurations appear in the prior art. Quite commonly there is a backup ring having a cylindrical through opening through which the piston extends for movement on its reciprocating path. Then there is generally an extrusion resistant, non-abrasive seal material (generally a high molecular weight plastic material) used in combination with a resilient more yielding material (e.g. an O-ring) to activate the seal under low pressure, and also possibly with other seal rings (sometimes a metal ring) to cooperate to provide overall a seal which is able to come into proper sealing engagement over the great range of pressures encountered.

Longevity of these seals is a serious problem. Even relatively high extrusion and wear resistant seal materials are subject to extrusion under very high pressures when exposed to minute open areas. Further, where there is an interface of relatively moving metallic components with the high pressures involved, wear of these components can be a problem.

One prior art seal arrangement which has recently been used to provide a metal backup ring which has a close tolerance fit with the reciprocating piston. The circumferential, radially inward surface of this backup ring has an annular groove or recesses area, and the backup ring has, forwardly and rearwardly of this recessed area, two surface portions which are in a close tolerance fit with the piston. Forwardly of the backup ring, there is an extrusion resistant seal sleeve having an annular configuration so as to fit closely against the outer surface of the piston and the inner surface of the cylinder. The rear face of the sleeve fits against the forward surface of the backup ring, and the forward portion of this seal sleeve has a radially outward circumferential groove to receive a resilient compressible O-ring that fits against the inner face of the cylinder. At the rear radially outward edge portion of the extrusion resistant seal sleeve, the surface of the seal sleeve is tapered in a somewhat frusto-conical configuration, and there is a metal seal ring having a triangular cross sectional configuration positioned in that area. This forms a static seal for the radially inward rear surface portion of the cylinder, and also for the interface of the backup ring and the cylinder.

While the above described prior art seal assembly has functioned with reasonable effectiveness in high pressure fluid intensifiers, wear and deterioration have been significant problems, and there have been various efforts to identify the nature of these problems and also to provide appropriate solutions for the same. One of the difficulties is that since the actual functioning of the seal takes place in a enclosed very high pressure environment, it is very difficult to get direct measurements and/or observation of the phenomena which take place during actual operation of the pump. Further, some of the tolerances are very small (e.g. clearances in the order of a thousandth or a few thousandths of an inch), this also making observation and obtaining meaningful data difficult. Thus, the designer of such high pressure seals is often left to his or her own resources to theorize what operating phenomena might be related to these problems and propound solutions directed at least partly on the basis of conjecture.

SUMMARY OF THE INVENTION

The high pressure seal assembly of the present invention is particularly adapted for use in connection with a cylinder and piston, where the cylinder defines a high pressure chamber and the piston reciprocates in the chamber with a high pressure discharge stroke and a low pressure intake stroke. The seal assembly has a high pressure forward end and a low pressure rear end.

The seal assembly comprises a backup ring having a through opening to receive the piston, this opening being defined by a circumferential inner ring surface having a forward ring surface portion, which has a close tolerance fit so as to be closely adjacent to a circumferential surface of the piston. The opening also has a rear ring surface portion which extends rearwardly from the forward ring surface portion in a rearwardly and radially expanding configuration so as to create a rearwardly and radially expanding gap between the circumferential inner ring surface of the opening and the piston surface. The gap has an expanded open rear portion, relative to a gap formed by the forward ring surface portion.

A nonabrading, extrusion resistance seal member fits circumferentially around the piston and extends axially along the piston. The seal member has a rear portion which is positioned adjacent to and forward of the though opening of the backup ring and which fits adjacent to the piston surface. The seal member is arranged in the seal assembly so as to be deformable under pressure in the high pressure chamber in a manner that a rear portion of the seal member deforms toward said backup ring and in sealing engagement with the piston.

The ring and the seal member are arranged in a manner that portions of a radially inward rear portion of the seal member which may extrude over a period of time between the forward ring surface portion and the piston will pass into the rearwardly and radially expanding gap.

In the preferred configuration, the assembly further comprises a seal positioning member which surrounds at least the rear portion of the seal member to press the rear portion of the seal member into sealing engagement with the piston. Desirably, the seal positioning member is fixedly connected to the backup ring in fluid tight relationship. More particularly, the seal positioning member comprises an annular flange means made integral with and extending forwardly from the backup ring.

The positioning member has a radially inwardly facing circumferential pressure surface portion spaced from the piston to define an annular seal area which has a width dimension sized to receive at least the rear portion of the seal member in wedging engagement in a manner that pressure in the chamber presses the rear portion of the seal member in the annular seal area and into sealing engagement. A preferred configuration is that the radially inwardly facing circumferential pressure surface portion has at least a circumferential portion thereof which slants inwardly and rearwardly. In one configuration, this radially inwardly facing circumferential pressure surface has in circumferential cross section a generally concavely curved configuration. In another configuration, it has a forward portion thereof which tapers inwardly and rearwardly, and a rear portion thereof which extends axially with less rearward and inward taper than the forward portion of the radially inwardly facing circumferential pressure surface portion.

In the preferred form, the seal member comprises a seal sleeve member, and there is a second seal member positioned between a forward portion of the seal positioning member and the seal sleeve member at a location forwardly of the rear portion of the seal sleeve member. This second seal member comprises a resilient material which is arranged to provide a low pressure seal for relatively low pressures in said chamber and activate said seal sleeve member as pressure in the chamber increases. A preferred configuration of the second seal member is an O-ring means which extends circumferentially around the seal sleeve member.

Also, in a preferred configuration, the positioning member is located between the piston and the cylinder, and there is second seal means positioned to form a seal for an interface between said cylinder and said backup ring at a location radially outward of said positioning member. In one configuration, the second seal means is positioned at a location between the radially outward surface of the positioning member and a radially inwardly facing surface of said cylinder. In another configuration, the second seal means is positioned between a rearwardly facing surface of the cylinder and a forwardly facing surface of the backup ring.

Also, in a preferred configuration the positioning member is fixedly connected to the backup ring in fluid tight relationship therewith, and the radially outward and radially inward surfaces of the positioning member are both exposed to high pressure in the chamber. Further, the backup ring is arranged relative to the positioning member, and the positioning member is so dimensioned, in a manner that radially inward and radially outward pressure exerted on the positioning ring are substantially balanced. Desirably, the radially outward and radially inward surfaces of the positioning member terminate at axial locations axially closely adjacent to one another to cause the balance of the radially inward and radially outward pressures.

As another feature of the present invention, in a modified configuration and the seal sleeve member has a plurality of axially spaced, annular grooves formed at a radially inward surface of the seal sleeve member. The seal sleeve member is positioned relative to the piston so that under conditions of high pressure in the chamber, fluid in the chamber is able to pass between the seal sleeve member and the piston sequentially to said annular grooves to experience successive pressure drops in said grooves.

In a preferred configuration, the forward ring surface portion has an axially extending width dimension between about 0.0 to $\frac{1}{4}$ of an inch, and more desirably between 0.0 to 150 of an inch. The rear ring surface portion extends rearwardly and outwardly at an angle of between 2° to 30° from a longitudinal center axis of the piston, and more desirably at an angle of between 2° to 10° to the longitudinal center axis.

Other features of the present invention will become apparent from the following detailed description.

DESCRIPTION OF THE PREFERRED EMBODIMENTS

A significant aspect of the present invention is the appreciation of certain problems with high pressure seals which, to the best knowledge of the applicants, have not been properly appreciated in the prior art. It is with what is believe to be a newly developed proper appreciation of such problems that the seal assembly of the present invention was conceived and developed. To obtain a proper understanding of what is surmised to be the nature of the problems and the solutions, it is believed that an appropriate presentation would be first to described the main components of the present invention and their general mode of operation, with this being followed by an explanation of the nature of the underlying problems which are at least partially solved by the present invention. Then there will be a more detailed description of how the arrangement of the seal assembly of the present invention uniquely solves these problems, and then a further description of modifications and a second embodiment.

Figure 1:
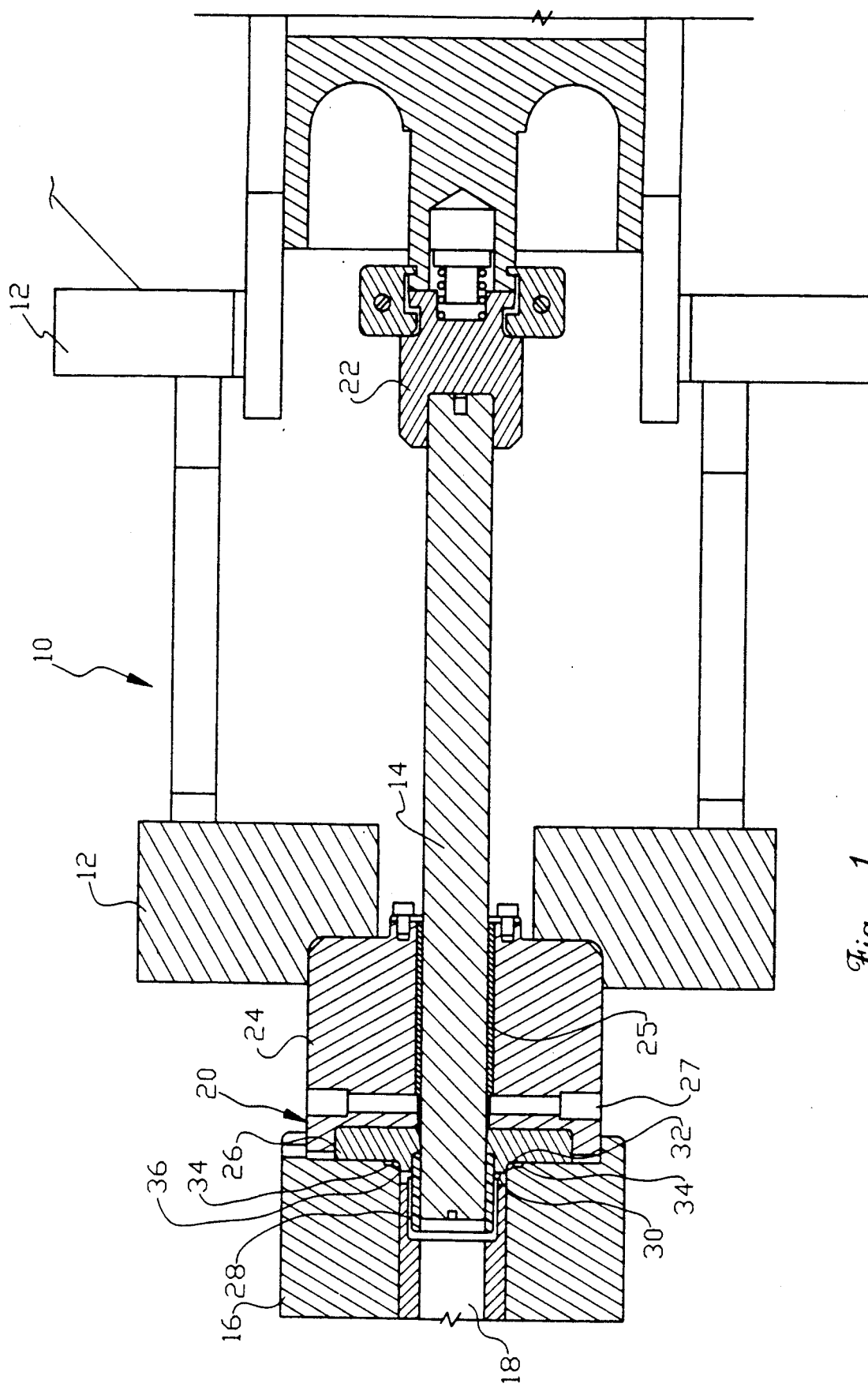
FIG. 1 is a sectional view of a portion of a high pressure cylinder and piston pump incorporating a first embodiment of the seal assembly of the present invention, with this sectional view being taken along the longitudinal center line of the pump.

A first embodiment of the present invention is shown in FIGS. 1 through 4, and reference is now made to FIG. 1 which shows a portion of a pump in which the seal assembly of the present invention is incorporated. The pump 10 comprises a housing structure 12 in which is positioned a plunger or piston 14, and a high pressure cylinder 16 which defines a chamber 18 in which the piston 14 reciprocates. The seal assembly 20 of the present invention provides a seal between the cylinder 16 and the piston 14.

The piston 14 is moved on its reciprocating path by means of a reciprocating drive member 22 which can in turn be actuated by a suitable drive means, such as a rotating crank shaft or the like. The piston 14 extends forwardly from the drive member 22 to extend through a guide block 24, thence through the seal assembly 20 and into the chamber 18. The guide block contains an elongate bearing sleeve 25 which has a close tolerance fit around the piston 14. At the forward part of the chamber 18, there is a suitable valve mechanism (not shown for ease of illustration) which discharges fluid from the chamber 18 on the high pressure stroke of the piston 14, and permits liquid (e.g. water) to flow into the chamber 18 on the low pressure return stroke of the piston 14. Passageways 27 are provided to circulate cooling water, and to remove extruded seal material.

Figure 2:
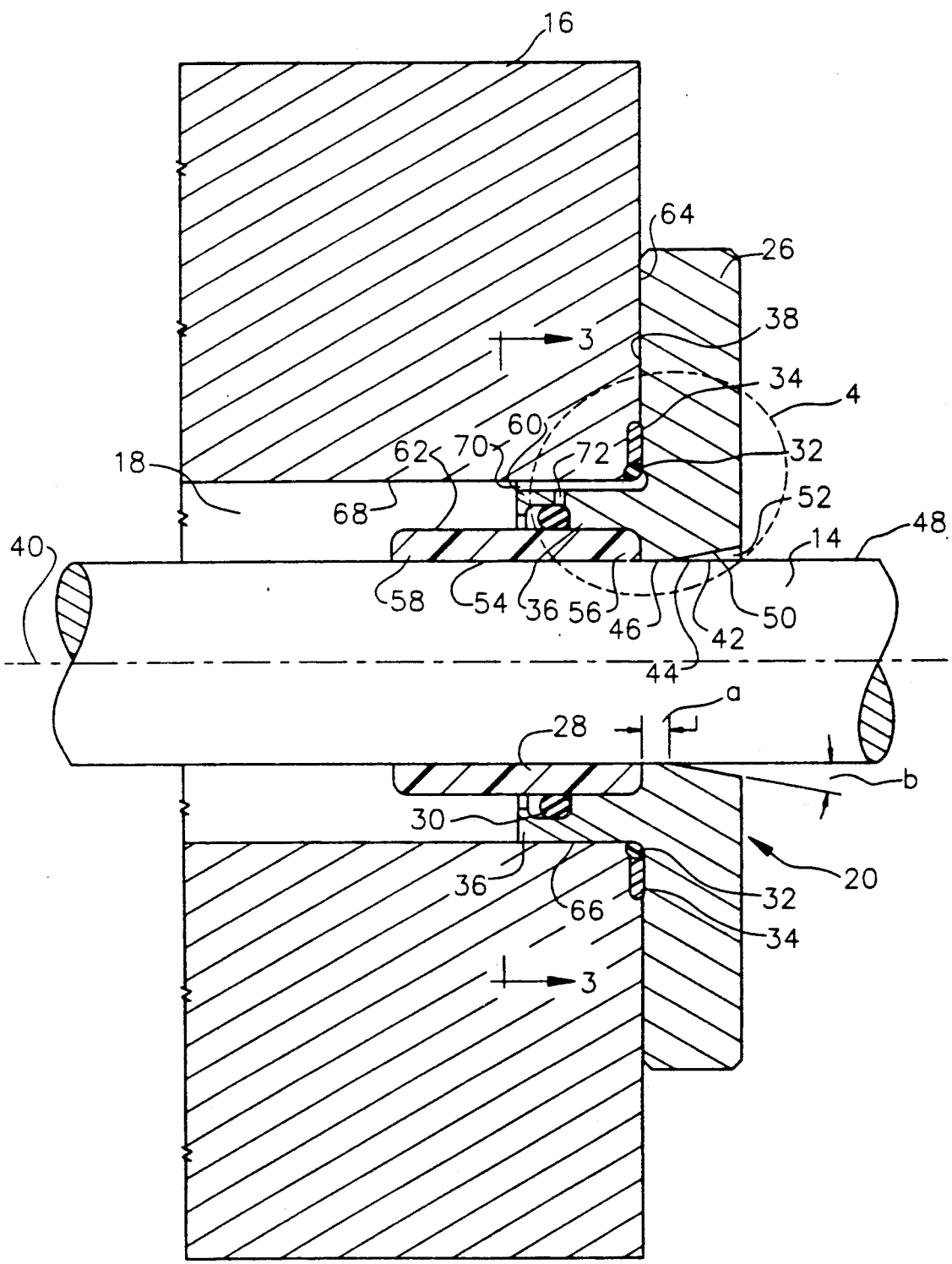
FIG. 2 is a sectional view, similar to FIG. 1 and drawn to an enlarged scale, showing the seal assembly of the first embodiment of the present invention with a seal sleeve in a related low pressure configuration.

With reference particularly to FIG. 2, the seal assembly 20 comprises five main components; namely, a back up ring 26, a seal sleeve 28, a first O-ring 30 that is positioned around the seal sleeve 28, a second O-ring 32 and a face seal 34. Another significant component of this valve assembly 20 is an annular positioning ring which is formed integrally with, and extends forwardly from, the forward face 38 of the backup ring 26.

In the following description, the term "forward" will denote a direction toward (or proximity with respect to) those portions of the pump apparatus and valve assembly which appear on the left of pages 1 or 2, while the term "rear" or "rearward" will denote the opposite location or direction. Thus, with respect to the seal assembly 20, the forward side of the seal assembly 20 will be that side facing, and proximate to, the high pressure chamber 18, while the rear side of the seal assembly 20 will denote proximity to the guide block 24. Thus, the piston 16 moves forwardly on its high pressure discharge stroke, and rearwardly on the intake stroke. Further, the assembly 20 will be considered as having a longitudinal center axis 40 which is coincident with the longitudinal axis of the piston 14 and the cylinder 16. The term "radially inward" will denote a direction toward, or proximity with respect to, the longitudinal axis 40, while the term "radially outward" will denote the opposite.

The backup ring 26 has a central through opening 42 defining an inwardly facing circumferential annular surface 44, this surface 44 having a forward cylindrical surface portion 46 which fits closely adjacent to an outer cylindrical surface 48 of the piston 14, and a rear surface portion 50 which tapers from the forward portion 46 in a rearwardly and radially expanding frustoconical configuration so as to provide a rearwardly expanding annular gap 52 between the surfaces 48 and 50. The arrangement of these surface portions 46 and 50, along with the annular gap 52, is considered, in conjunction with the other components of the valve assembly 20, to be significant in the present invention, and this will be explained in more detail later herein.

The seal sleeve 28 has a generally cylindrical configuration with an inner surface 54 which fits against the outer surface 48 of the piston 14. The seal sleeve 28 has a moderately extended axial length. Further, the seal sleeve 28 can be considered as having a rear portion 56 which is positioned within the rear part of the positioning flange 36 and a forward portion 58. The forward part of the positioning flange 36 is formed with an inwardly positioned annular groove 60 which receives therein and positions the first O-ring 30. This groove 60 is sized relative to the O-ring 30 so that the O-ring 30 in its relaxed position (i.e. without the chamber 18 being pressurized) bears against the outer surface 62 of the seal sleeve 28 with a normal low pressure sealing force.

With regard to the second O-ring 32 and the face seal 34, these cooperate to provide a seal between the forward face 38 of the backup ring 26 and the rearwardly facing surface 64 of the cylinder 16. The radially inward rear edge portion of the cylinder 16 is formed with a moderate annular recess in the rear surface 64, and the adjacent area of the backup ring 26 is formed with an adjacent and oppositely positioned annular recess, with these adjacent recesses forming an annular cavity to receive both the face seal 34 and the second O-ring 32, and with the second O-ring 32 being positioned against, and radially inwardly of, the face seal 34. The face seal 34 is made of an extrusion resistant plastic material.

The outer cylindrical surface 66 of the locating flange 36 fits within the rear portion of the inner cylindrical surface 68 of the cylinder 16 that defines the chamber 18. It will be noted that the flange 36 is provided with an axially extending pressure relief passageway 70 (also shown in FIG. 3) which leads to an area adjacent to the side surface of the second O-ring 32. Further, leading from this passageway 70 is a branch passageway 72 which opens to a side surface of the first O-ring 30. These passageways 70 and 72 do not need to communicate with one another, however. The function of these passageways 70 and 72 is to provide pressure relief between these O-rings 30 and 32 and their adjacent seal, and this is described in another patent application, entitled "Vented Static Seal Assembly," filed on Apr. 4, 1989, Ser. No. 333,343, and assigned to the assignee of the present application. Briefly, the function of these passageways 70 and 72 is to alleviate the effect of a high pressure buildup between the O-rings 30 and 32 and their respective seals so that the O-rings 30 and 32 can remain properly positioned, this provision of the relief passageways 70 and 72 alleviating a problem of premature deterioration of the O-rings 30 and 32. Since this is described fully in the other patent application noted above and being filed concurrently herewith (which application is incorporated by reference in the text of this present application), and since a more detailed description of the function of these passageways 70 and 72 is not essential for an understanding of the concepts incorporated in this present application, there will be no further description of the configuration and functioning of these pressure relief passageways 70 and 72. Alternatively, the positioning flange 36 can have its radially outward surface spaced from inner surface of the cylinder 16 to provide an annular venting passageway or space.

With the foregoing general description in mind, let us now direct our attention to certain problems which exist in seals of this general type. In general, there have been known in the prior art for a number of years various configurations of seal assemblies having a back-up ring, an extrusion resistant seal ring, and a resilient O-ring, with these components cooperating to provide a high pressure seal. In one such prior art arrangement, the back-up ring is provided with a central through opening which has a close tolerance fit with the piston, and the high strength seal comes into sealing engagement with the outer surface of the piston. The back-up ring positions and provides support for the extrusion resistant seal against the very high compression forces that are present during the pressure stroke in the high pressure chamber defined by the cylinder.

To discuss one of these prior art problems more specifically, reference will be made to the arrangement of the present invention. It will be noted that at the interface of the back-up ring surface portion 46 and the piston surface 48 there is a very small gap which in a close tolerance fit may be about one thousandth of an inch in width. With the substantial pressure variations in the chamber 18 and with the reciprocation of the piston 48, the seal sleeve 28 tends to extrude into this gap. In accordance with the analysis involved in the present invention, it is believed that when such extrusion takes place, some of the seal material will extrude and become packed into the area of the interface between the piston 14 and the back-up ring 26 with the largest gap width, and the packed material will transmit a large side force, thus causing a very small lateral displacement of the piston 14. This lateral displacement widens the gap at this portion of the cylinder/back-up ring interface, and pushes the piston more toward the opposite surface that defines the opening of the backup ring. This permits more seal material to extrude into the enlarged portion of the gap, and eventually cause the piston 14 to come into abrading contact with the opposite portion of the surface of the back-up ring that defines the opening for the piston. This causes deterioration of the surfaces 46 and 48, and also compromises the close tolerance fit between the backup ring central opening 42 and the piston 14. This in turn exacerbates the problem of the seal sleeve 28 further extruding into the gap between the backup ring 26 and the piston 14.

It has been found that this problem of the deterioration due to this extrusion phenomenon can be greatly alleviated with the particular configuration of the surface portions 46 and 50 of the opening surface 44. The axial dimension or width of the surface area 46 (indicated at "a" in FIG. 2) is made as small as possible so that the overall surface area of this portion 46, which is non-tapered and is closely adjacent to the piston surface 48, is as small as possible. Ideally, the surface 46 would have almost no axial dimension so as to have only line proximity with the piston 48. However, since the radially inward forward edge of the backup ring 46 is subjected to rather high forces because of the very high pressure existing in the chamber 18 working against the seal sleeve 28, there has to be a certain axial width to the surface portion 46 to provide this portion of the backup 26 with adequate structural strength. Nevertheless, this area 46 is in the present invention made small enough so that as material extrudes from the seal sleeve 28 into the area of the surface portion 46, it has a very short path to work its way into the expanding area beneath the outwardly tapering surface portion 50, and during the reciprocation of the piston 14, this extruded material simply breaks off and moves quickly out of the gap 52, causing only minor dislocating forces in the piston 14. It has been found that this arrangement of the surface portions 46 and 50 significantly reduces the extrusion/packing problems in a manner that the premature deterioration of the seal assembly components in this area is alleviated.

However, it should be recognized that whether or not the above explanation of the phenomena of the extrusion of the seal material of the seal sleeve 28 into the gap between the backup ring 26 and the piston 14 and how this affects the alignment of the piston 14 and the wearing of the surfaces is accurate or even correct at all, it has been found that this arrangement of the backup ring surface portions 46 and 50 has alleviated this problem to a large extent so as to provide a longer life for the seal sleeve 28 and also for a longer period of time where the piston surface 48 and the backup ring interior surface portions 46 and 50 maintain their appropriate relative locations, tolerances and surface integrity.

Further, with this arrangement, it has been found that the seal sleeve 28 can be arranged so that it will be expected, with continued use, to gradually extrude evenly throughout the circumference into the very small gap within the surface portion 46 and feed itself rearwardly over a period of time as it extrudes in small increments. At the same time, the first O-ring 30 maintains sealing relationship around the outer surface 62 of the seal sleeve 28 as the seal sleeve 28 gradually moves by the O-ring 30 over a period of time.

Desirably, the axial dimension "a" of the backup ring surface 46 would be between 0.0 to 0.25 inch, with a preferred range being between 0.0 to 0.125 inch. The clearance between the surface portion 46 and the piston surface portion 48 would be between about 0.0001 to 0.01 inch, and more preferably between about 0.0001 to 0.001 inch. The precise angular slant of the surface portion 50 is of itself not believed to be critical, but this angular slant (indicated at "b" in FIG. 2) is desirably between about 2° to 30° degrees, and more preferably between about 2° to 10° degrees.

The slanted configuration of the surface 50 provides structural support for the forward inner edge of the backup ring at the surface 46. The axial length of the surface position 50 should be great enough to provide sufficient width of the gap 52 to discharge the extruded seal material. It is to be understood that there could be further variations in the configuration of the surface 50 (such as having the rear portion be cylindrically shaped), provided that the slanted portion has sufficient axial length to provide sufficient gap width to accomplish its intended function of permitting the discharge of extruded seal particles. For convenience of manufacture and effectiveness of operation, however, the preferred configuration is as disclosed herein.

To discuss another aspect of the problems alleviated by the present invention, in order for the sleeve 28 to adequately form a seal with the piston 14, the inner surface 54 of the seal sleeve 28 has to press against the piston surface 48 with sufficient pressure to prevent the fluid in the chamber 18 from passing between the seal sleeve 28 and the piston surface 48. However, if the radially inward pressure at the seal sleeve surface 54 is sufficiently greater and is exerted over a sufficiently large area against the piston surface 48, this creates a buildup of heat, and this in turn can cause deterioration of the material of the seal sleeve 28. One way of solving this is simply to shorten the axial dimension of the seal sleeve 28 to reduce the area of frictional engagement. However, this would tend to shorten the useful life of the seal sleeve 28 with regard to its self feeding function of gradually extruding over a period of time by the backup ring 26. Further, the effectiveness of the seal provided by the seal sleeve 28 may be compromised by shortening the potential seal area in an axial direction between the seal surface 54 and the piston surface 48.

Figure 4:
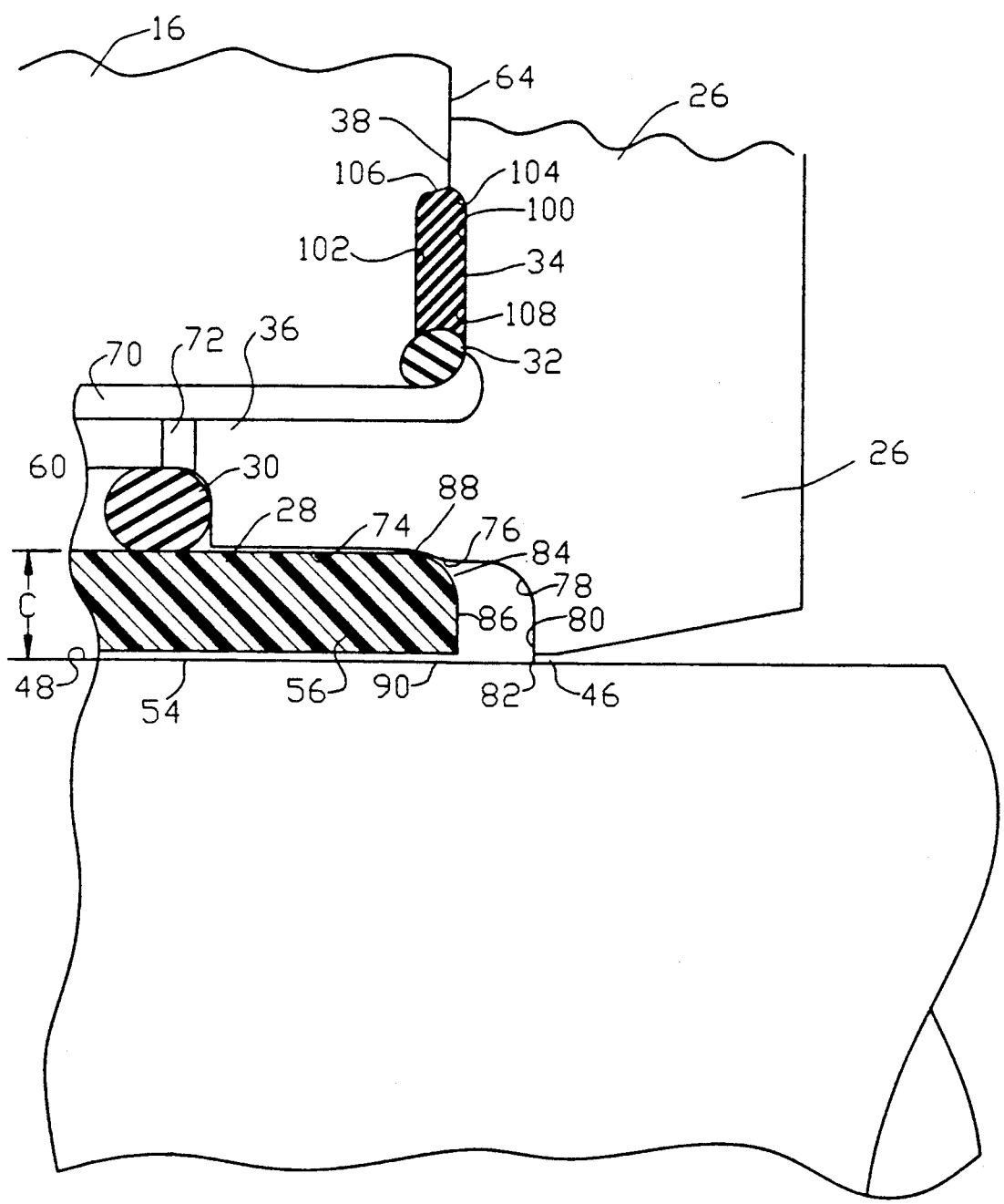
FIG. 4 is a view similar to FIG. 2, drawn to a further enlarged scale, and showing that portion of the seal assembly circled at numeral 4 of FIG. 2, with the seal sleeve being positioned forwardly of its sealing position for purposes of illustration.

With reference to FIG. 4, it can be seen that the positioning flange 36 has a radially inwardly facing circumferential surface 74 which in its forward portion is cylindrical. However, the rear portion of this surface 74 begins to curve in a converging pattern radially inwardly at an area 76, with this inward curve having a fixed or decreasing radius of curvature in a rearward direction as at 78, until this curved portion 78 blends into a rearmost planar (or moderately slanted) forwardly facing surface portion 80 that terminates at a radially inward edge 82 where it meets the aforementioned backup ring close tolerance surface portion 46. The rear portion 56 of the sleeve seal 28 has an uncompressed outer diameter which is sized so that its outer surface fits tightly against the flange surface 74 and the thickness dimension ("c") is sized so that the inner surface 54 fits loosely around the piston surface 48. It will be noted that the rear radially outward surface portion 84 of the sleeve seal 28 has in peripheral cross section a curved configuration which is in a sharper curve than the curved surface 76-78 of the flange 36. Thus, as can be seen in FIG. 4, the rear generally transverse surface portion 86 of the seal sleeve 28 is, in the relaxed configuration of the seal sleeve 28, spaced forwardly of the forwardly facing surface portion 80 of the backup ring 26, and the sleeve 28 would be in this position prior to being pressed rearwardly into its sealing position, as shown in FIG. 2.

During the forward discharge stroke of the piston 14, the very high pressure developed in the chamber 18 pushes the seal sleeve 28 rearwardly so that a rear radially outward rear portion 88 of the seal sleeve 28 becomes wedged within the curving inwardly slanting surface portion 76 of the flange 36. The seal sleeve 28 remains in this location during the reciprocation of the piston 14. This causes the rearmost portion of the seal sleeve 28 to compress between the flange surface portion 76 and the piston surface 48, thus pressing a rear radially inward surface portion 90 inwardly against the piston surface 48 with an increasing pressure. As the seal sleeve 28 is forced further rearwardly, the increasing inwardly rearward taper of the surface 76-78 causes further compression and radially inward deformation of the rearward portion 56 of the seal sleeve 28 to cause even greater pressure at the surface portion 90. At yet higher pressure, the rear portion of the seal sleeve 28 can be deformed so that the rear surface 86 becomes immediately adjacent to (and in contact with) the forwardly facing surface portion 80 of the backup ring 26. As indicated previously, over a period of time, there can be some extrusion of the material of the seal sleeve 28 at the forward edge 82 and into the small gap between the backup ring surface portion 46 and the piston surface 48.

The effect of the wedging action of the seal sleeve 28 moving rearwardly and into wedging engagement with the surface 76 and 78 causes contact pressure of the seal sleeve rear surface portion 90 against the piston surface 48 in a limited area relatively close to the forward edge 82 of the backup ring 26, while the radially inward pressure exerted by the seal sleeve 28 at a more forward portion is substantially zero, since there is actually a small annular gap around the forward part of the seal sleeve and the piston 14. The overall result is that a quite effective seal is provided between the seal sleeve 28 and the piston surface 48, but the area of high pressure dry, frictional engagement is kept sufficiently small so that overall an undo amount of heat due to frictional engagement is not created. Further, the rather gradual curve 76-78 at the juncture of the flange 36 and the backup ring 26 is such that there are no great areas of concentration of stress in the back-up ring 26 which could otherwise result if there were relatively sharp corners or transition curves between the positioning flange 36 and the backup ring 26.

It will be noted that the material which comprises the seal sleeve 28 is a wear and extrusion resistant material, but yet is a resilient material which upon relaxation of the deforming pressure will return to its original unstressed position. On the return stroke of the piston 14 there is low pressure in the chamber 18, and the sleeve 28 assumes a more relaxed configuration. Upon high pressure developing in the chamber 18, the seal sleeve 28 will be pressed rearwardly and deform (as described above) to properly form the seal, as shown in FIG. 2.

Figure 5:
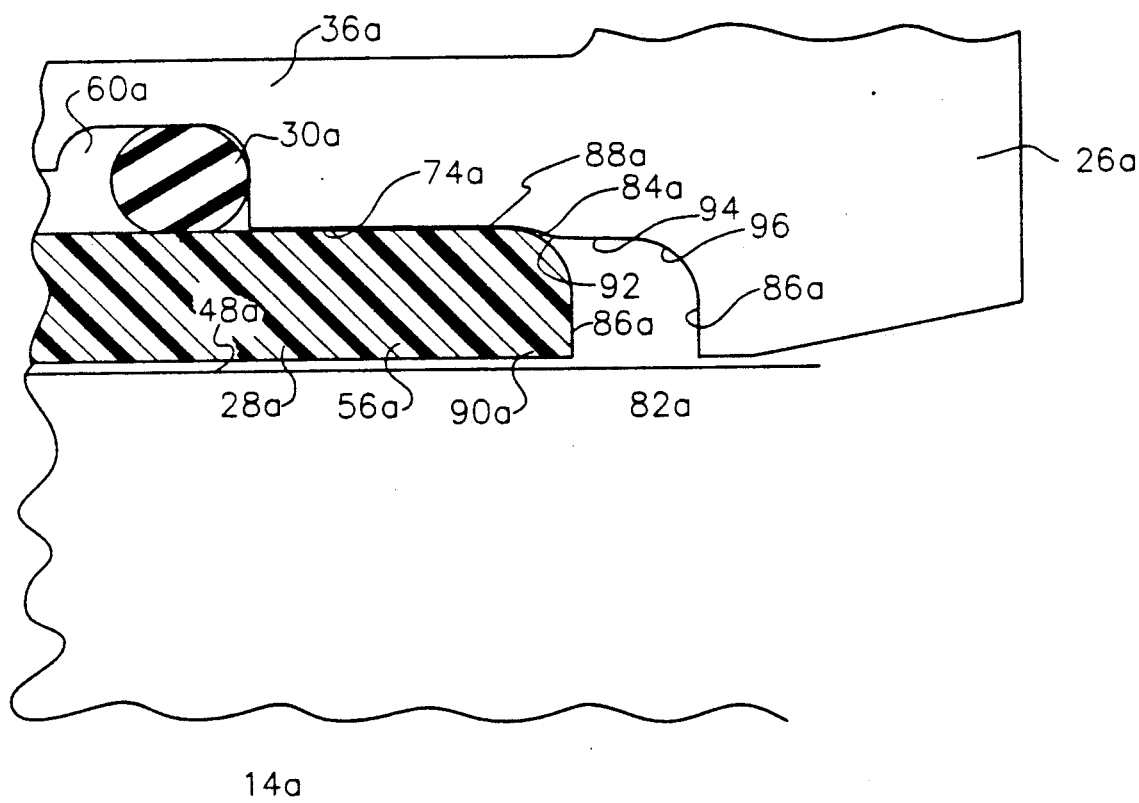
FIG. 5 is a view similar to FIG. 4, but showing a modified arrangement of the radially inward surface of the positioning flange of the first embodiment, also with the seal sleeve being positioned forwardly of its sealing position.

FIG. 5 shows a modified configuration of the inner surface of the flange 36. To distinguish the components and elements of FIG. 5 from those of FIG. 4, corresponding portions will be given like numerical designations with an "a" suffix distinguishing those of the modified form of FIG. 5.

As shown in FIG. 5, the flange 36a has its inwardly facing cylindrical forward surface portion 74a which has a snug fit against the outer surface of the seal sleeve 28a. However, the rear portion of the surface 74a is configured somewhat differently in that as seen in circumferential cross section it curves into a rearwardly and radially inwardly slanting surface portion 92 which in turn leads with a curved transition portion into a generally cylindrical surface portion 94 having a diameter slightly less than the surface portion 74a. Thus, as the rear portion 56a of the seal sleeve 28a is pressed rearwardly, its outer rear surface portion 88a becomes compressed by the slanted surface portion 92 and remains compressed under the cylindrical surface portion 94. The cylindrical surface portion 94 curved at a transitional area 96 to blend into the forwardly facing surface portion 86a of the backup ring 26a.

It can readily be seen by an examination of FIG. 5 that basically the same sealing functions are accomplished by the radially inward compression of the rear part of the seal sleeve 28a. One possible disadvantage of the arrangement shown in FIG. 5 is that the curvature at 96 is relatively sharp, in comparison with a corresponding transition portion of the arrangement of FIG. 4, which thus raises the possibility of stress concentrations in the area 96. However, this arrangement of FIG. 5 is illustrated to show that there can be different configurations in the radially inwardly facing surface portions of the positioning flange 36 or 36a to accomplish the proper inward compression, length limiting and sealing function as described above.

With reference now back to FIGS. 2 and 4, the configuration and function of the second O-ring 32 and the face seal 34 will now be discussed. As indicated previously, portions of the backup ring 26 and the rear radially inward portion of the cylinder 16 have annular recesses or cutouts, these being illustrated in FIG. 4 at 100 and 102, respectively, to accommodate the face seal 34 and the second O-ring 32. The radially outward surface portions of these recesses 100 and 102 (these being indicated at 104 and 106, respectively) slant toward the interface of the surfaces 38 and 64 in a radially outward direction.

The face seal 34 has an annular configuration and is formed of an extrusion resisting and high molecular weight plastic which has the same characteristics as the material of the seal sleeve 28.

The second O-ring 32 is made of a resilient yielding material, such as neoprene. This second O-ring 32 provides a low pressure seal and will deform under pressures below those at which the face seal 34 will deform to activate the seal 34. It will be noted that the passageway 70 extends to a lateral side surface portion of the O-ring 32 so as to provide a pressure relief vent. As indicated previously, this is discussed in more detail in the U.S. patent application entitled "Vented Static Seal Assembly" which is mentioned earlier herein and is being filed concurrently with the present application.

During the high pressure stroke of the piston 14, the fluid pressure which moves between the outer flange surface 66 and the cylinder surface 68 tends to compress the O-ring 32 against the face seal 34, with these two seal members 32 and 34 cooperating to provide a proper seal for the innerface of the surfaces 38 and 64.

To discuss another facet of the present invention, it should be recognized that the forwardly facing surface portion 80 of the backup ring 26 and the forwardly facing surface portion 108 at the location of the recess 100 are at approximately the same axial location. Thus, during the high pressure discharge stroke of the piston 14, the fluid pressure which is exerted on the opposite inner and outer surfaces 74 and 66 of the flange 36 tend to balance out, so that there is not an excess of either radially outward or radially inward fluid pressures exerted on the positioning flange 36.

With further reference to FIG. 4, it will be noted that at the interface of the backup ring surface portion 80 and the rear surface portion 86 of the seal sleeve 28, because of the presence of the locating flange 36, these adjacent surfaces 80 and 86 are isolated from the interface of the backup ring surface 38 and the cylinder surface 64. Thus, at the rearward location adjacent to the backup ring radially inward forward edge 82, the function of the seal sleeve 28 is such that it can be optimized to provide the appropriate seal between the seal sleeve 28 and the piston 14 and is not required to serve an additional function of providing a seal between the backup ring 26 and the cylinder 14.

Figure 6:
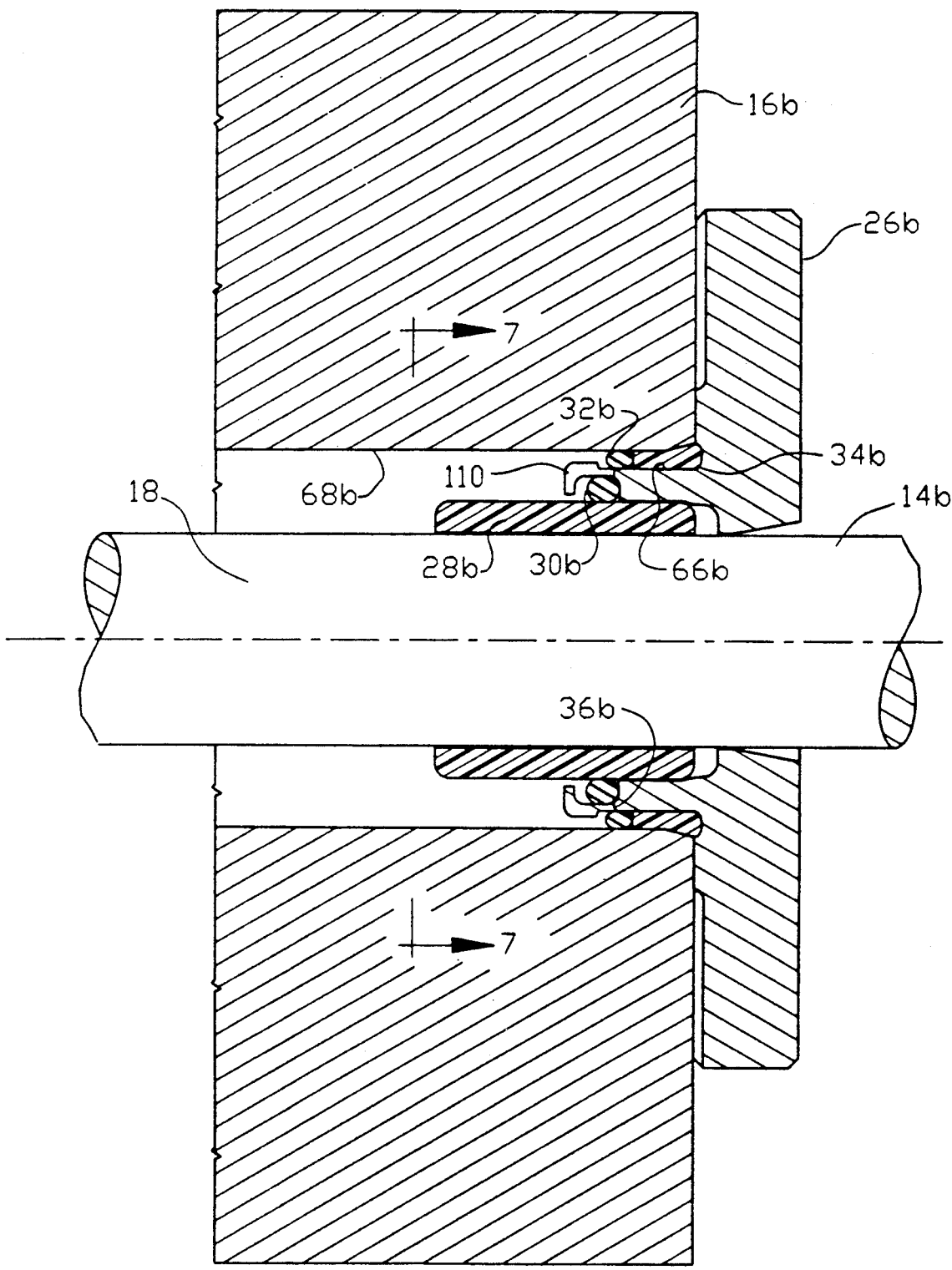
FIG. 6 is a view similar to FIG. 2, showing a second embodiment of the present invention.
Figure 7:
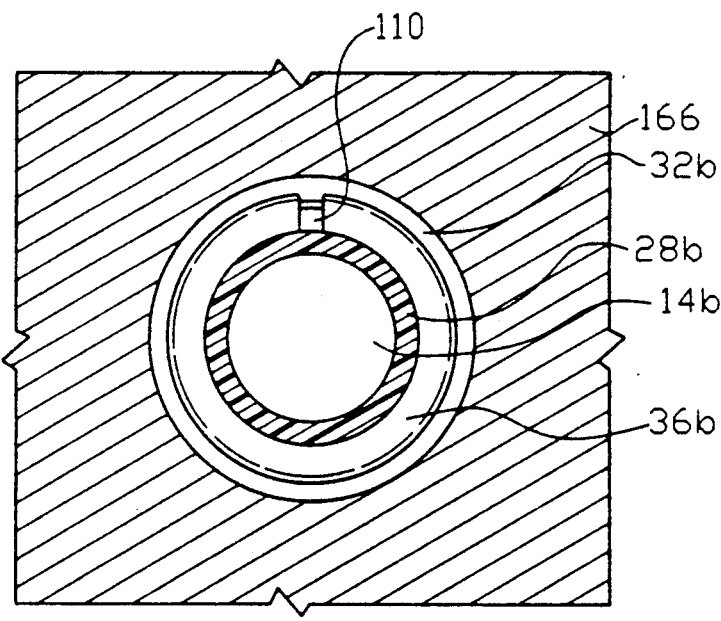
FIG. 7 is a sectional view taken along line 7—7 of FIG. 6.
Figure 3:
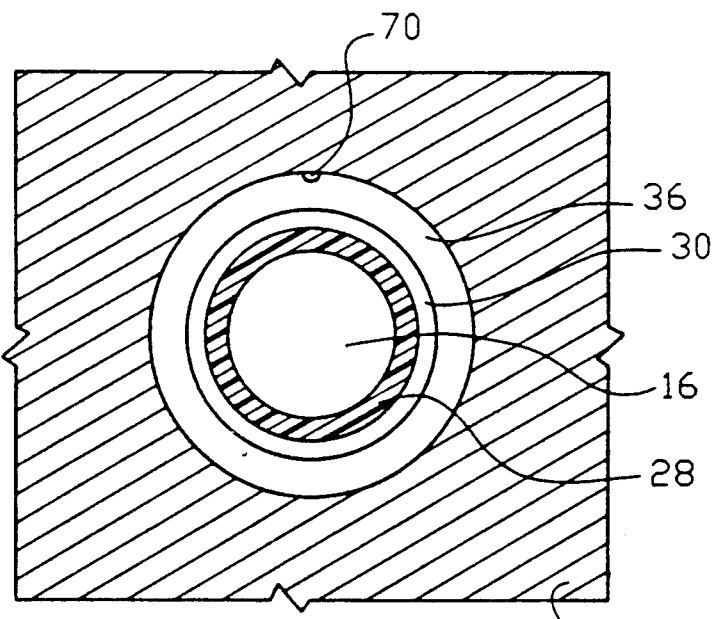
FIG. 3 is a sectional view taken along line 3—3 of FIG. 2.

A second embodiment of the present invention is shown in FIGS. 6 and 7. Components of this second embodiment which are similar to corresponding components of the first embodiment will be given like numerical designations with a "b" suffix distinguishing those of the second embodiment. This second embodiment shown in FIGS. 6 and 7 is substantially the same as the embodiment of FIGS. 1 through 4, except that the location of the face seal 34b and the second O-ring 32b are changed so that these two seal members are positioned between the radially outward surfaces 66b of the positioning flange 36b and the cylinder surface 68b.

This also involves a modification of the pressure relief passageways, and in this particular configuration, it is required only to provide one pressure relief passageway 110 which communicates with side surface portions of both of the O-rings 30b and 32b.

It is believed that the operation of the seal assembly 20b of the second embodiment and the functions of the components thereof will be readily understandable from the above description of the first embodiment, so no further detailed description of the second embodiment will be provided herein.

Figure 8:
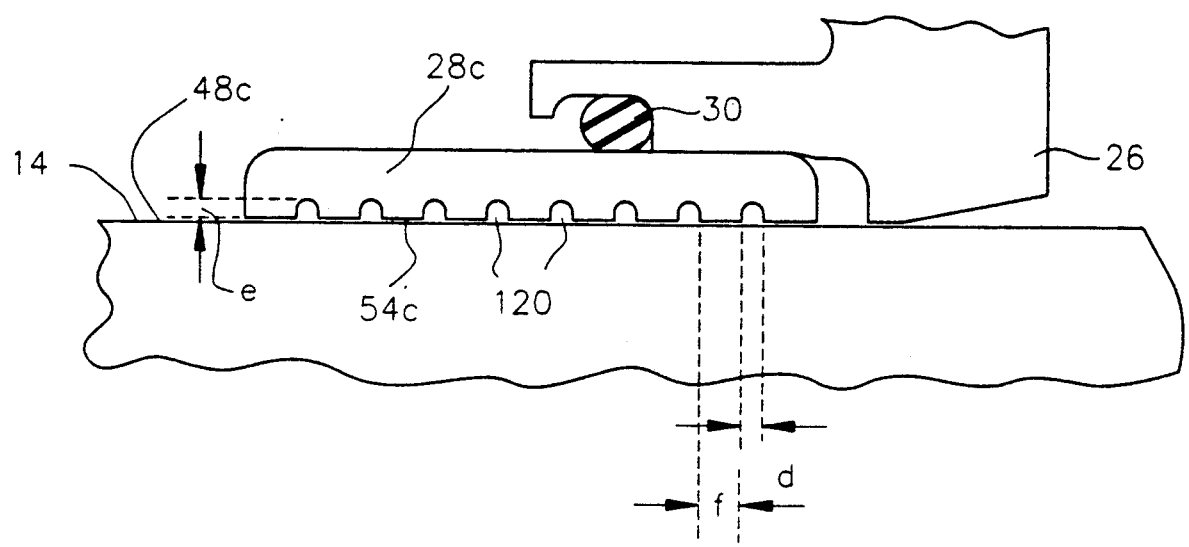
FIG. 8 is a sectional view similar to FIG. 3, showing a modified form of the seal sleeve.

In FIG. 8 there is shown a modified form of the seal sleeve 28. To distinguish this seal sleeve shown in FIG. 8, a "c" suffix will be added to the corresponding numerical designations.

The seal sleeve 28c fits around the surface 48c of the piston 14. The O-ring 30 and the backup ring 26 are the same as in the first embodiment. However, the interior surface 54c of the sleeve 28c has a plurality of axially spaced annular grooves 120 which open in a radially inward direction to the piston surface 48c.

In a preferred embodiment, with the seal sleeve 28c having an axial length of about 0.5 inches and an inside diameter of about 0.75 inches, these grooves have an axial width dimension of between about 0.01 to 0.03 inch and more preferably between about 0.02 to 0.03 inch, this dimension being shown at "d". The depth dimension (shown at "e") could be between about 0.01 to 0.02 inch. The area of the radially inward surface 54c is divided into annular contact areas, and the width of such areas could be between about 0.02 to 0.05 inch, and more desirably about 0.03 to 0.04 inch (this dimension being shown at "f").

These grooves 120 function to cause successive pressure drops in an axially rearward direction along the interface of the sleeve 28c with the piston surface 48c. As some fluid under increasing pressure begins to pass between the forward portion of the seal sleeve 28c and the piston surface 48c, this fluid will enter the most forward groove 120, and there will be some pressure drop as it enters the most forward groove 120. Then as there is some leakage along the interface of the seal sleeve surface 54c and the piston surface 48c, there will be a further pressure drop to the next rear adjacent groove 120. This accumulated pressure assures the driving force to rearwardly seat the sealing sleeve 28 as previously described. These grooves also permits the contact length to be limited.

On the intake stroke of the piston 14c, the pressure in these grooves 120 would be relieved by leakage in a forward direction between the seal sleeve 28c and the piston 14c.

It is to be understood that various modifications could be made in the present invention without departing from the basic teachings thereof, and that the present detailed description is presented in order to disclose the presently preferred embodiments, and this is not intended to limit the scope of the claims which follow.

What is claimed is:

1. A high pressure seal assembly for a cylinder and piston, where the cylinder defines a high pressure chamber and the piston reciprocates in said chamber with a high pressure discharge stroke and a low pressure intake stroke, said seal assembly being arranged to prevent an imbalance of lateral forces applied to said piston, said seal assembly having a high pressure forward end and a low pressure rear end, said seal assembly comprising:

a. a backup ring having a through opening to receive said piston, said opening being defined by a circumferential inner ring surface having a forward ring surface portion which has a close tolerance fit so as to be closely adjacent to a circumferential piston surface of said piston, and also having a rear ring surface portion which extends rearwardly from said forward ring surface portion in a rearwardly and radially expanding configuration so as to create a rearwardly and radially expanding gap between the circumferential inner ring surface of the opening and the piston surface, said gap having an expanded open rear portion, relative to a gap formed by said forward ring surface portion;

b. a non-abrading, extrusion resistant seal member which fits circumferentially around said piston and extends axially along said piston, said seal member having a rear portion which is positioned adjacent to and forward of said through opening of the backup ring and which fits adjacent to said piston surface;

c. said seal member being arranged in said seal assembly so as to be deformable under pressure in said high pressure chamber in a manner that a rear portion of said seal member deforms toward said backup ring and in sealing engagement with said piston;

d. said ring and said seal member being arranged, and said forward ring surface portion having a sufficiently small axial dimension so that portions of a radially inward rear portion of said seal member which may extrude over a period of time between said forward ring surface portion and said piston will pass into said rearwardly and radially expanding gap so as to alleviate extruded seal material causing said imbalance of lateral forces on said piston.

2. The assembly as recited in claim 1, wherein said assembly further comprises a seal positioning member surrounding at least the rear portion of said seal member to press the rear portion of the seal member into sealing engagement with said piston.

3. The assembly as recited in claim 2, wherein said seal positioning member is fixedly connected to said backup ring in fluid tight relationship.

4. The assembly as recited in claim 3, wherein said seal positioning member comprises an annular flange means made integral with and extending forwardly from said backup ring.

5. The assembly as recited in claim 2, wherein said seal positioning member has a radially inwardly facing circumferential pressure surface portion spaced from said piston to define an annular seal area which has a width dimension sized to receive at least the rear portion of the seal member in wedging engagement in a manner that pressure in said chamber presses the rear portion of the seal member in the annular seal area and into sealing engagement.

6. The assembly as recited in claim 5, wherein said radially inwardly facing circumferential pressure surface portion has at least a circumferential portion thereof which slants radially inwardly and rearwardly.

7. The assembly as recited in claim 6, wherein said radially inwardly facing circumferential pressure surface portion has in circumferential cross section a generally concavely curved configuration.

8. The assembly as recited in claim 6, wherein said radially inwardly facing circumferential surface portion has a forward portion thereof which tapers inwardly and rearwardly, and a rear portion thereof which extends axially with less rearward and inward taper than the forward portion of the radially inwardly facing circumferential pressure surface position.

9. The assembly as recited in claim 2, wherein said seal member comprises a seal sleeve member, and there is a second seal member positioned between a forward portion of said seal positioning member and said seal sleeve member at a location forwardly of the rear portion of the seal sleeve member.

10. The assembly as recited in claim 9, wherein said second seal member comprises a resilient material which is arranged to provide a low pressure seal for relatively low pressures in said chamber and activate said seal sleeve member as pressure in the chamber increases.

11. The assembly as recited in claim 10, wherein said second seal member comprises an O-ring means which extends circumferentially around said seal sleeve member.

12. The assembly as recited in claim 2, wherein said positioning member is located between said piston and said cylinder, and there is second seal means positioned to form a seal for an interface between said cylinder and said backup ring at a location radially outward of said positioning member.

13. The assembly as recited in claim 12, wherein said second seal means is positioned at a location between the radially outward surface of said positioning member and a radially inwardly facing surface of said cylinder.

14. The assembly as recited in claim 12, wherein said second seal means is positioned between a rearwardly facing surface of said cylinder and a forwardly facing surface of said backup ring.

15. The assembly as recited in claim 12, wherein said seal positioning member is fixedly connected to said backup ring in fluid tight relationship therewith, said seal positioning member having a radially outward surface and a radially inward surface, both of which surfaces are exposed to high pressure in said chamber, said backup ring being arranged relative to said positioning member, and said positioning member being dimensioned, in a manner that radially inward and radially outward pressures exerted on said positioning member are substantially balanced.

16. The assembly as recited in claim 15, wherein rear edge portions of the radially outward and radially inward surfaces of the positioning member terminate at axial locations axially closely adjacent to one another to cause said radially inward and radially outward pressures to substantially balance one another.

17. The assembly as recited in claim 1, wherein said seal member comprises a seal sleeve member extending axially along said piston, said seal sleeve member having a plurality of axially spaced, annular grooves formed at a radially inward surface of said seal sleeve member, said seal sleeve member being positioned relative to said piston in a manner that under conditions of high pressure in said chamber, fluid in said chamber is able to pass between said seal sleeve member and said piston sequentially to said annular grooves to experience successive pressure drops in said grooves.

18. The assembly as recited in claim 1, wherein said forward ring surface portion has an axially extending width dimension which is between about 0.0 to ¼th of an inch.

19. The assembly as recited in claim 18, wherein said axially extending width dimension is between about 0.0 to ⅛th of an inch.

20. The assembly as recited in claim 1, wherein said rear ring surface portion extends rearwardly and outwardly at an angle of between about 2° to 30° from a longitudinal center axis of said piston.

21. The assembly as recited in claim 20, wherein said rear ring surface portion extends rearwardly and outwardly at an angle of between 2 degrees to 10 degrees to the longitudinal center axis of the piston.

22. The assembly as recited in claim 1, wherein
   a. said axially extending width dimension is between about 0.0 to ¼th of an inch.
   b. said rear ring surface portion extends rearwardly and outwardly at an angle of between 2 degrees to 30 degrees to the longitudinal center axis of the piston.

23. The assembly as recited in claim 22 wherein:
   a. said axially extending width dimension is between about 0.0 to ⅛th of an inch; and
   b. said rear ring surface portion extends rearwardly and outwardly at an angle of between about 2° to 10° from a longitudinal center axis of said piston.

24. A high pressure seal assembly for a cylinder and piston, where said cylinder defines a high pressure chamber and the piston reciprocates in said chamber with a high pressure discharge stroke and a low pressure intake stroke, said seal assembly having a high pressure forward end and a low pressure rear end, said seal assembly comprising:
   a. a backup ring having a through opening to receive said piston, said opening being defined by a circumferential inner ring surface;
   b. a non-abrading, extrusion resistant seal member which fits circumferentially around said piston and extends axially along said piston, said seal member having a rear portion which is positioned adjacent to and forward of said through opening of the backup ring and which fits adjacent to said piston surface;
   c. said seal member being arranged in said seal assembly so as to be deformable under pressure in said high pressure chamber in a manner that a rear portion of said seal member deforms toward said backup ring and in sealing engagement with said piston;
   d. a seal positioning member surrounding at least the rear portion of said seal member at a rear seal area to press the rear portion of the seal member radially inwardly into sealing engagement with said piston, in a manner the upon wear of the rear portion of the seal member, portions of the seal member forwardly of the rear portion of said seal member move toward said rear seal area and into sealing engagement with said piston.

25. The assembly as recited in claim 24, wherein said seal positioning member is fixedly connected to said backup ring in fluid tight relationship.

26. The assembly as recited in claim 25, wherein said seal positioning member comprises an annular flange means made integral with and extending forwardly from said backup ring.

27. The assembly as recited in claim 24, wherein said seal positioning member has a radially inwardly facing circumferential pressure surface portion spaced from said piston to define an annular seal area which has a width dimension sized to receive at least the rear portion of the seal member in wedging engagement in a manner that pressure in said chamber presses the rear portion of the seal member in the annular seal area and into sealing engagement.

28. The assembly as recited in claim 27, wherein said radially inwardly facing circumferential pressure surface portion has at least a circumferential portion thereof which slants radially inwardly and rearwardly.

29. The assembly as recited in claim 28, wherein said radially inwardly facing circumferential pressure surface portion has in circumferential cross section a generally concave curved configuration.

30. The assembly as recited in claim 28, wherein said radially inwardly facing circumferential surface portion has a forward portion thereof which tapers inwardly and rearwardly, and a rear portion thereof which extends axially with less rearward and inward taper than the forward portion of the radially inwardly facing circumferential pressure surface portion.

31. The assembly as recited in claim 24, wherein said seal member comprises a seal sleeve member, and there is a second seal member positioned between a forward portion of said seal positioning member and said seal sleeve member at a location forwardly of the rear portion of the seal sleeve member.

32. The assembly as recited in claim 31, wherein said second seal member comprises a resilient material which is arranged to provide a low pressure seal for relatively low pressures in said chamber and activate said seal sleeve member as pressure in the chamber increases.

33. The assembly as recited in claim 32, wherein said second seal member comprises an O-ring means which extends circumferentially around said seal sleeve member.

34. The assembly as recited in claim 24, wherein said positioning member is located between said piston and said cylinder, and there is second seal means positioned to form a seal for an interface between said cylinder and said backup ring at a location radially outward of said positioning member.

35. The assembly as recited in claim 34, wherein said second seal means is positioned at a location between the radially outward surface of said positioning member and a radially inwardly facing surface of said cylinder.

36. The assembly as recited in claim 34, wherein said second seal means is positioned between a rearwardly facing surface of said cylinder and a forwardly facing surface of said backup ring.

37. The assembly as recited in claim 34, wherein said seal positioning member is fixedly connected to said backup ring in fluid tight relationship therewith, said seal positioning member having a radially outward surface and a radially inward surface, both of which surfaces are exposed to high pressure in said chamber, said backup ring being arranged relative to said positioning member and said positioning member being dimensioned in a manner that radially inward and radially outward pressure exerted on said positioning member are substantially balanced.

38. The assembly as recited in claim 37, wherein rear edge portions of the radially outward and radially inward surface of the positioning member terminate at axial locations axially closely adjacent to one another to cause said radially inward and radially outward pressures to substantially balance one another.

39. The assembly as recited in claim 24, wherein said seal member comprises a seal sleeve member extending axially along said piston, said seal sleeve member having a plurality of axially spaced, annular grooves formed at a radially inward surface of said seal sleeve member, said seal sleeve member being positioned relative to said piston in a manner that under conditions of high pressure in said chamber, fluid in said chamber is able to pass between said seal sleeve member and said piston sequentially to said annular grooves to experience successive pressure drops in said grooves.

40. A high pressure seal assembly for a cylinder and piston, where the cylinder defines a high pressure chamber and the piston reciprocates in said chamber with a high pressure discharge stroke and a low pressure intake stroke, said seal assembly having a high pressure forward end and a low pressure rear end, said seal assembly comprising:
  a. a backup ring having a through opening to receive said piston, said opening being defined by a circumferential inner ring surface;
  b. a seal member which fits circumferentially around said piston and has a rear portion which is positioned adjacent to and forward of said through opening of the backup ring;
  c. a seal positioning member surrounding at least the rear portion of said seal member, said positioning member being fixedly connected to said backup ring in fluid tight relationship and extending forwardly therefrom, with said positioning member being located between said piston and said cylinder; and
  d. a second seal means positioned to form a seal for an interface of said cylinder and said backup ring at a location radially outward of said positioning member; and
  e. said seal positioning member having a radially outward surface and a radially inward surface, both of which surfaces are exposed to high pressure in said chamber, said backup ring being arranged relative to said positioning member, and said positioning member being dimensioned, in a manner that radially inward and radially outward pressures exerted on said positioning member are substantially balanced, with rear edge portions of the radially outward and radially inward surfaces of the positioning member terminating at axial locations axially closely adjacent to one another to cause said radially inward and radially outward pressures to substantially balance one another.

41. The assembly as recited in claim 40, wherein said seal positioning member comprises an annular flange means made integral with said backup ring.

42. The assembly as recited in claim 40, wherein said seal positioning member has a radially inwardly facing circumferential pressure surface portion spaced from said piston to define an annular seal area which has a width dimension sized to receive at least the rear portion of the seal member in wedging engagement in a manner that pressure in said chamber presses the rear portion of the seal member into the annular seal area and into sealing engagement.

43. The assembly as recited in claim 40, wherein said second seal means is positioned at a location between the radially outward surface of said positioning member and a radially inwardly facing surface of said cylinder.

44. The assembly as recited in claim 40, wherein said second seal means is positioned between a rearwardly facing surface of said cylinder and a forwardly facing surface of said backup ring.

45. The assembly as recited in claim 24, wherein a forward portion of said seal member fits more loosely around said piston relative to the rear portion of the seal member.

46. The assembly as recited in claim 45, wherein only the rear portion of the seal member is pressed into sealing engagement with said piston.

* * * * *